United States Patent
Abkowitz et al.

(10) Patent No.: US 6,635,098 B2
(45) Date of Patent: Oct. 21, 2003

(54) LOW COST FEEDSTOCK FOR TITANIUM CASTING, EXTRUSION AND FORGING

(75) Inventors: Stanley Abkowitz, Lexington, MA (US); Susan M. Abkowitz, Winchester, MA (US); Harold L. Heussi, Essex, MA (US); Kevin M. McCarthy, Billerica, MA (US)

(73) Assignee: Dynamet Technology, Inc., Burlington, MA (US)

( * ) Notice: Subject to any disclaimer, the term of this patent is extended or adjusted under 35 U.S.C. 154(b) by 0 days.

(21) Appl. No.: 10/072,875

(22) Filed: Feb. 12, 2002

(65) Prior Publication Data

US 2002/0119068 A1 Aug. 29, 2002

Related U.S. Application Data

(60) Provisional application No. 60/267,722, filed on Feb. 12, 2001.

(51) Int. Cl.⁷ .................................................. B22F 3/15
(52) U.S. Cl. ............................ 75/245; 75/235; 75/236; 75/244; 419/12; 419/13; 419/14; 419/19; 419/28; 419/42; 419/48
(58) Field of Search .......................... 75/235, 236, 245, 75/244; 419/12, 13, 14, 19, 28, 42, 48

(56) References Cited

U.S. PATENT DOCUMENTS

| | | | | |
|---|---|---|---|---|
| 2,906,654 A | | 9/1959 | Abkowitz | 420/417 |
| 3,729,971 A | * | 5/1973 | Gurganus et al. | 419/42 |
| 3,933,473 A | * | 1/1976 | Dickson | 75/10.62 |
| 3,953,205 A | * | 4/1976 | Cox et al. | 419/33 |
| 5,332,545 A | * | 7/1994 | Love | 420/420 |
| 5,897,830 A | | 4/1999 | Abkowitz et al. | |

* cited by examiner

*Primary Examiner*—Ngoclan Mai
(74) *Attorney, Agent, or Firm*—Finnegan, Henderson, Farabow, Garrett & Dunner, LLP

(57) ABSTRACT

A low cost titanium, titanium alloy material, or Ti matrix composite comprising clean and divided titanium turnings that are blended with titanium, titanium alloy powder, and/or ceramic powder and consolidated is provided. A method of making the material is also provided. The low cost material is formed into preshapes, such as a billet, which is subsequently used as feedstock for extrusion, forging, casting, or rolling.

14 Claims, No Drawings

LOW COST FEEDSTOCK FOR TITANIUM CASTING, EXTRUSION AND FORGING

This application claims the benefit of Provisional Application Ser. No. 60/267,722, filed Feb. 12, 2001.

BACKGROUND OF THE INVENTION

1. Field of the Invention

This invention relates to titanium and titanium alloy and titanium matrix composite components manufactured by using a low cost material or feedstock for casting, extrusion or forging. The feedstock of this invention is composed of a consolidated blend of titanium or titanium alloy fine turnings mixed with titanium or titanium alloy in powder metal form. The low cost material or feedstock is formed into a billet or other preform shape.

2. Description of the Related Art

Titanium and titanium alloy component shapes are typically machined from mill products, that are in the form of a bar, plate or sheet. The machining operations are expensive and the large excess of expensive titanium raw material which must be discarded is costly since the machining scrap has low value compared to the prime mill product. In order to reduce machining and material loss, industry frequently utilizes casting, extrusion or forging practices to produce near net shape components that are closer to final size. The material typically used as starting stock in these operations is titanium or titanium alloy mill product in billet form. These processes result in producing a component shape close to final size and save the significant expense of machining the entire billet stock.

More recently, titanium powder metallurgy has been proven to offer an additional approach to producing close to shape components. As shown in U.S. Pat. No. 5,897,830, the contents of which are herein incorporated by reference, the application of a powder metal consolidated billet has shown an advantage in its use as a casting electrode for casting titanium metal matrix composites.

SUMMARY OF THE INVENTION

The product of this invention incorporates waste from titanium and titanium alloy machining, referred to as turnings, with the powder metal blend to form a consolidated component. The powder metal can be a blend of powders, such as commercially pure titanium powder and master alloy powder. This consolidated component may be in the form of a billet, which can be used as starting stock for extrusion and forging operations.

Many potential applications for titanium and titanium alloys are not commercialized because of the high cost of the raw material. The technologies utilized in this invention permit the manufacture of more economical components by utilizing a low cost material as starting stock for production of cast or extruded shapes. The low cost material for the production of cast or extruded shapes may be in the form of a billet. In addition, low cost bar or preforms comprising titanium and titanium alloy machine turnings may be used as starting stock for manufacture of forged shapes.

DETAILED DESCRIPTION OF THE INVENTION

A low cost titanium or titanium alloy material comprising from 10% to 80% clean and divided titanium turnings is provided. The turning are blended with titanium or titanium alloy powder and consolidated to at least 90% of theoretical density.

Such a material may be formed into a product by casting, extrusion or forging. The material is optionally blended with a master alloy powder which contains intended alloying ingredients, such as when used to form Ti-6Al-4V.

The present invention may be also be used to form a low cost titanium alloy matrix composite material comprising from about 10% to about 90% clean and divided titanium turnings blended with titanium powder, master alloy powder, and ceramic particles. Such a composite material may also be consolidated to at least 90% of theoretical density in the form of a feedstock billet or preform shape. Materials according to the present invention may be made into in a tank track shoe, an automotive connecting rod, piston pin or valve by forging.

In one example of the inventive material, about 50% Ti-6Al-4V alloy turnings and about 50% powder can be blended, where the powder comprises a combination of titanium powder and Al—V alloy powder. It is also possible to substitute part of the powder with a ceramic material. For example, the powder content may be adjusted to comprise about 40% powder and about 10% ceramic powder. The ceramic powder can be any suitable filler traditionally used in metal matrix composites, such as a carbide, boride, nitride, or oxide of Ti, Si, Al, and W, and mixtures thereof.

The method of making pure titanium billet feedstock using titanium machining turnings comprises blending titanium powder with titanium turnings and isostatically pressing the blended powder and turnings to form a compact. Compacting is generally performed by cold isostatic pressing, and followed by vacuum sintering and/or hot isostatic pressing to form a high density billet.

Similarly, the method of making Ti-6Al-4V alloy billet feedstock using Ti-6Al-4V machining turnings comprises blending titanium powder with titanium Al—V master alloy powder, and Ti-6Al-4V turnings and cold isostatically pressing the blended powder and turnings to form a green compact. The compact is subsequently formed into a high density billet by a combination of vacuum sintering, and hot isostatic pressing.

As in the above methods, a method of making Ti metal matrix composite billet feedstock using Ti-6Al-4V machining turnings also comprises blending titanium powder with titanium Al—V master alloy powder, a ceramic powder, and Ti-6Al-4V turnings. The blended materials are consolidated preferably by cold isostatically pressing the blended powder and turnings to form a compact followed by vacuum sintering and subsequently hot isostatic pressing may be employed to form a high density billet. The above processes all result in a high density billet (e.g., >90% of theoretical density) that can be used in an extrusion, a forging or a rolling process.

As described, the feedstock of the current invention is comprised of titanium or titanium alloy clean and finely divided machining scrap turnings blended with titanium or titanium alloy powder. "Finely divided" is defined as turnings having a size of less than 5 mm, with certain embodiments having a size of less than 1 mm. Generally, the scrap turnings are cleaned to remove contaminating elements, such as lubricants, which have been introduced during machining.

The powder and turnings are blended, and subsequently consolidated to form a compact using traditional techniques, such as cold isostatic pressing. Further consolidation includes vacuum sintering, and hot isostatically pressing, which may be used alone or in combination. In addition, the powder and turnings may be directly hot isostatically pressed. The final product is consolidated to a high density compact, typically 90–99% of theoretical density.

The consolidated component may take any shape, including a billet shape when used as feedstock for extrusion, casting or forging operations. The billet shape is beneficial since it can be directly extruded, rolled or forged to closer shape. Also the feedstock could be in the form of another pre-shaped preform for forging where desired, or it could be a shaped component that directly enters an extrusion, forging, or rolling operation. For example, tubular preforms may be advantageous for certain extrusion or forging operations.

The titanium powder and alloy powder content of the blend tend to facilitate the compaction of the blend with turnings. To produce a homogeneous Ti-6Al-4V alloy, the blend should consist of Ti-6Al-4V turnings mixed with Ti-6Al-4V pre-alloyed powder or pure titanium powder and master alloy powder. A master alloy powder is defined as the powder containing the intended alloying ingredients, e.g., the precursor powders.

While not required, the master alloy powder generally matches the alloy of the scrap turnings. For example, to produce a commercially pure titanium compact, unalloyed titanium turnings are directly blended with commercially pure titanium. Similarly, to produce a Ti-6Al-4V alloy, Ti-6Al-4V alloy turnings are blended with commercially pure Ti powder, and a master alloy powder comprising Al and V, wherein such powders are mixed in an appropriate ratio to give a final product having a stoichiometric Ti-6Al-4V composition. An example of the Ti-6Al-4V alloy used according to the present invention is provided in U.S. Pat. No. 2,906,654, the entire contents of which are herein incorporated by reference.

Other titanium alloys and titanium matrix composites can be produced by this process with the incorporation of alloying elements and/or metallic compounds in powder form added to the titanium powder blend. By adding proper proportions of TiC or $TiB_2$, for example, and blending the compounds with a titanium powder blend and scrap turnings, as previously described, a uniform distribution of the TiC or $TiB_2$ compounds in the sintered and hot isostatically pressed product will result. In addition to TiC and $TiB_2$, other ceramics materials which may be incorporated into the development of a titanium matrix composite include carbides, borides, nitrides, and oxides of Ti, Al, Si, and W, and mixtures thereof.

While the powder proportion which facilitates compaction can be as low as 20% by weight, the percentage of powder that most readily forms a compact would be a 90% content. Even at this high amount, the compact would still utilize 10% of the low cost turnings.

Though the invention has been described with reference to only a limited number of examples, it is to be understood that variants thereof may be practiced without departing from the inventive spirit or scope.

What is claimed is:

1. A titanium or titanium alloy material comprising from about 10% to about 80% clean and divided titanium turnings, wherein said turnings are blended with titanium or titanium alloy powder and consolidated to at least 90% of theoretical density.

2. The material of claim 1 which is formed into a product by casting, extrusion or forging.

3. A titanium or titanium alloy material, comprising from about 10% to about 80% clean and divided titanium turnings blended with titanium or titanium alloy or master alloy powder, and consolidated to at least 90% of theoretical density, wherein said material is preformed feedstock that is forged into a final shape.

4. The material of claim 3 which is formed into a tank track shoe, an automotive connecting rod, piston pin or valve by forging.

5. A titanium alloy matrix composite material comprising from about 10% to about 90% clean and divided titanium turnings blended with titanium powder, master alloy powder, and ceramic particles consolidated to at least 90% of theoretical density, wherein said material is in the form of a feedstock billet or preform shape.

6. The material of claim 5 which is formed into a tank track shoe, an automotive connecting rod, piston pin or valve by forging.

7. The material of claim 1 comprising:

about 50% Ti-6Al-4V alloy turnings; and about 50% powder, wherein said powder comprises a combination of titanium powder and Al—V alloy powder.

8. The material of claim 1 comprising:

about 50% Ti-6Al-4V turnings;

about 40% powder, wherein said powder comprises a combination of titanium powder and Al—V alloy powder; and about 10% ceramic powder.

9. The material of claim 8, wherein said ceramic powder is at least one powder chosen from a carbide, boride, nitride, or oxide of Ti, Si, Al, and W.

10. A method of making pure titanium billet feedstock using titanium machining turnings, said method comprising:

blending titanium powder with titanium turnings;

isostatically pressing the blended titanium powder and titanium turnings to form a compact;

vacuum sintering and/or hot isostatic pressing the compact to form a high density billet that can subsequently be processed by extrusion, forging, casting, or rolling.

11. A method of making Ti-6Al-4V alloy billet feedstock using Ti-6Al-4V machining turnings, said method comprising:

blending titanium powder with titanium Al—V master alloy powder, and Ti-6Al-4V turnings;

isostatically pressing the blended powder and turnings to form a compact;

vacuum sintering, and hot isostatic pressing the compact to form a high density billet that can subsequently be processed by extrusion, forging, casting, or rolling.

12. A method of making Ti metal matrix composite billet feedstock using Ti-6Al-4V machining turnings, said method comprising:

blending titanium powder with titanium Al—V master alloy powder, at least one ceramic powder, and Ti-6Al-4V turnings;

isostatically pressing the blended powder and turnings to form a compact; and vacuum sintering and/or hot isostatic pressing the compact to form a high density billet that can subsequently be processed by extrusion, forging, casting, or rolling.

13. A Ti metal matrix composite billet feedstock comprising:

a blend of titanium powder, titanium Al—V master alloy powder, at least one ceramic powder, and Ti-6Al-4V turnings, wherein said at least one ceramic powder is a carbide, boride, nitride, or oxide of Ti, Si, Al, and W.

14. The Ti metal matrix composite billet feedstock of claim 13, wherein said ceramic powder is TiC or $TiB_2$.

* * * * *